United States Patent [19]

Brown

[11] 4,286,824

[45] Sep. 1, 1981

[54] WHEEL WITH REPLACEMENT SPOKES

[75] Inventor: Raymond C. Brown, Tarzana, Calif.

[73] Assignee: Superior Industries International, Inc., Van Nuys, Calif.

[21] Appl. No.: 105,920

[22] Filed: Dec. 21, 1979

[51] Int. Cl.³ .............................................. B60B 7/00
[52] U.S. Cl. ................................. 301/37 SS; 301/67; 301/104; 403/129
[58] Field of Search .................. 301/37 SS, 37 R, 54, 301/55, 58, 61, 67, 68, 70, 73, 74, 104; 403/129; 152/87, 88, 97, 98, 99, 100, 102–104; 242/55.2; 256/65, 67

[56] References Cited

U.S. PATENT DOCUMENTS 2,500,514  3/1950  Bozoti .................................. 242/55.2
4,180,293  12/1979  Norris et al. .......................... 301/104

FOREIGN PATENT DOCUMENTS 766223  6/1934  France .................................... 242/55.2

Primary Examiner—H. Grant Skaggs
Attorney, Agent, or Firm—Fulwider, Patton, Rieber, Lee & Utecht

[57] ABSTRACT

An automotive vehicle wheel having a solid wheel body, provided with replaceable rows of inner and outer spokes. The spokes are purely ornamental and are readily replaceable in the event of damage. Such replaceability is made possible by providing each spoke with a spring-loaded longitudinally moveable mounting member which places such spokes in longitudinal compression so as to hold them in place upon the wheel body.

7 Claims, 3 Drawing Figures ns with the desires of different designers.

WHEEL WITH REPLACEMENT SPOKES

BACKGROUND OF THE INVENTION

Authentic automobile wire spoke wheels, while attractive, are subject to several disadvantages not inherent to conventional solid wheels. Primarily, wire spoke wheels are both expensive to manufacture and troublesome to maintain. Such wheels have traditionally been formed of chrome-plated steel. Because of the shape of modern automobile wheels, it is difficult, if not impossible to uniformly chrome-plate the rim portion of the wheel. Another disadvantage inherent to most conventional authentic automobile wire spoke wheels, is that the spokes that protrude through the tire rim into the tire area. Accordingly, it is necessary to either attempt to seal the aperture in the tire rim through which the outer end of the spokes protrude, or alternatively, a tube-type tire must be utilized. Tube-type tires, however, are not presently popular. Yet another disadvantage of authentic automobile wire spoke wheels is that when such wheel engages a road hazard, curb, or other solid object, the spokes must often be adjusted and returned. This procedure requires special equipment and the services of a skilled mechanic. It is likewise well known, that authentic automobile wire spoke wheels utilize a hub and a rim connected by the wire spokes with the opening between the hub and the rim permitting grease, oil and road dirt to coat the spokes. Such spokes are difficult to clean, except by steam cleaning.

SUMMARY OF THE INVENTION

It is a major object of the present invention to provide a vehicle wheel combining the advantages of a conventional solid wheel body with the appearance of an authentic wire spoke wheel.

Another object of the present invention is to provide a vehicle wheel of the afore-described nature which is economical to manufacture, rugged of construction and which will afford a long and trouble-free service life.

A more particular object of the present invention is to provide a vehicle wheel of the afore-described nature, which includes a solid wheel body that includes a hub, with a first row of wire spokes extending between the intermediate portion of the wheel body and the radially outer portion thereof, and a second row of spokes extending from the outer portion of the hub to the intermediate portion of the solid wheel body. Such first and second rows of spokes are readily replaceable by means of spring-loaded longitudinally moveable mounting members secured to one end of each of such spokes, these mounting members being longitudinally extendable relative to their respective spokes, so as to thereby place such spokes in longitudinal compression and wedging such spokes in place upon the wheel.

Another particular object of the present invention is to provide a vehicle wheel having a solid wheel body, with replaceable wire spokes, one end of each spoke having a longitudinally extendable mounting member that is spring-loaded into engagement with a socket to place the spokes in longitudinal compression to wedge the spokes in place upon the wheel body.

An additional object of the present invention is to provide a vehicle wheel of the afore-described nature wherein the number and pattern of these spokes may take various forms so as to permit the aesthetic design of the wheel to be varied in accordance with the desires of different designers.

Other objects and advantages of the present invention will become apparent from the following detailed description taken in conjunction with the accompanying drawings.

DESCRIPTION OF THE PREFERRED EMBODIMENT

Figure 1:
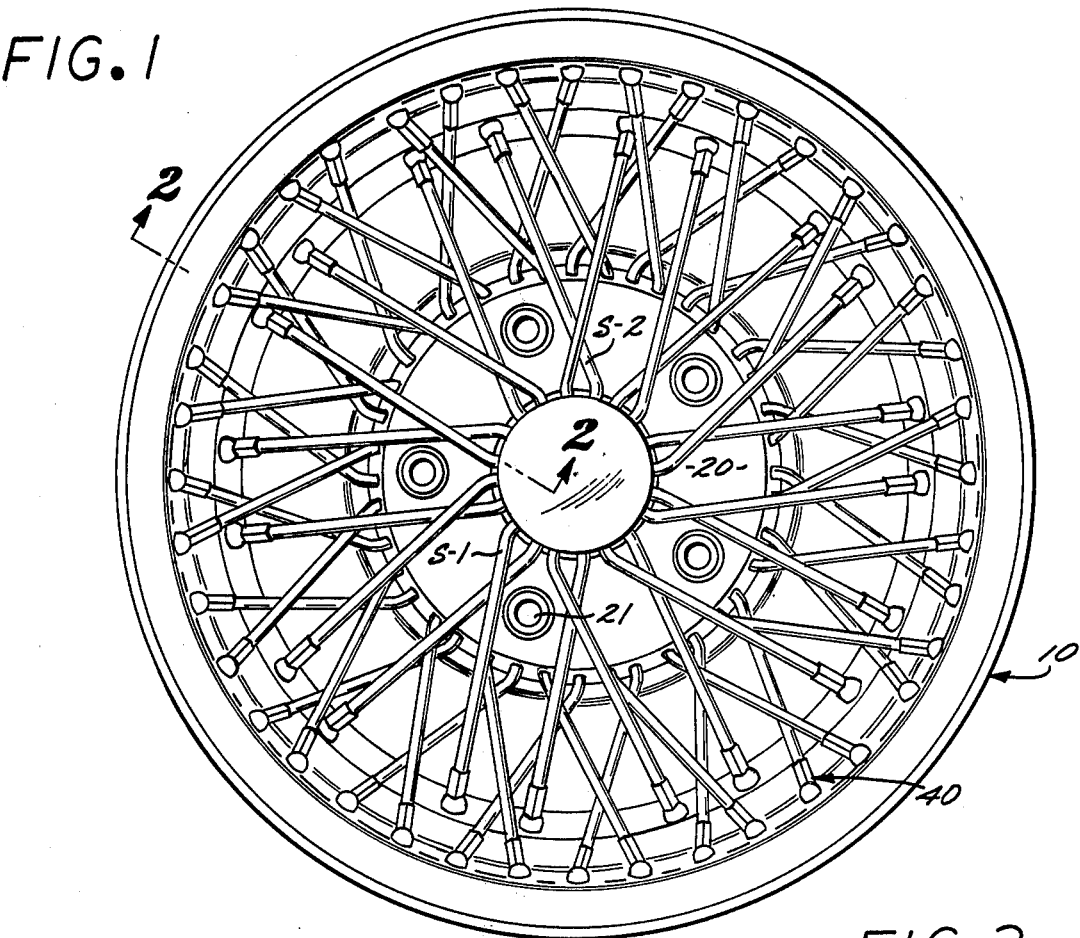
FIG. 1 is a side elevational view showing the exterior of a preferred form of vehicle wheel embodying the present invention.
Figure 3:
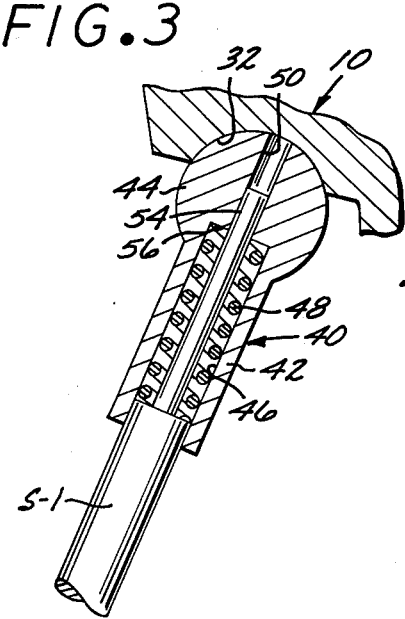
FIG. 3 is an enlarged view of the encircled area designated 3 in FIG. 2.
Figure 2:
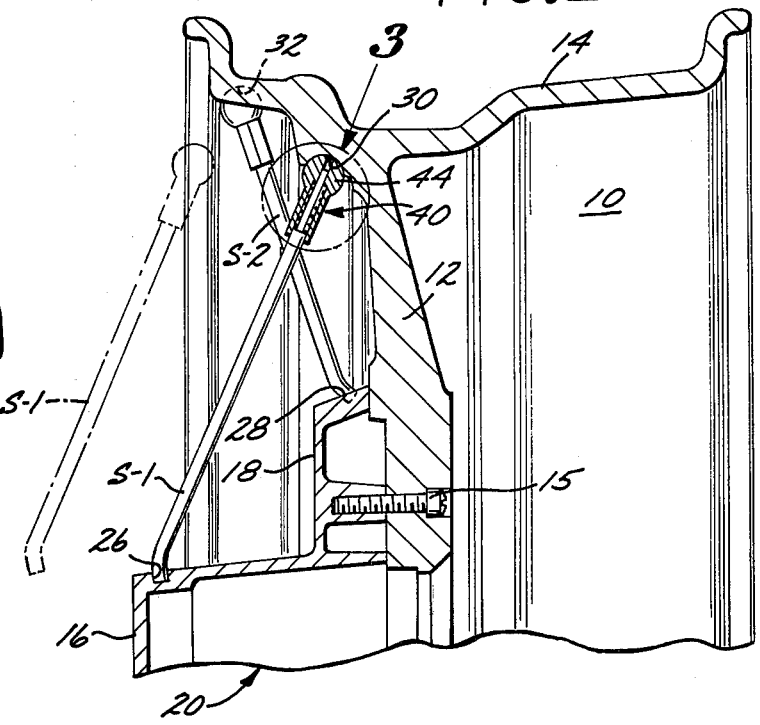
FIG. 2 is a sectional view taken in enlarged scale along line 2—2 of FIG. 1.

Referring to the drawings, there is shown in FIGS. 1-3 a preferred form of wire spoke vehicle wheel embodying the present invention. The wheel includes a solid body casting, generally designated 10, having a radially extending bolt-on flange 12 formed at its radially outer portion with a conventional multi-flange drop center tire rim 14. The bolt-on flange 12 is secured upon the vehicle's brake drum (not shown), in a conventional manner by lug bolts (not shown). A hub, generally designated 20, is coaxially rigidly secured to the radially inner portion of bolt-on flange 12 by bolts 15. The casting 10 and hub 20 when joined define a solid wheel body. The radially outer portion of the bolt-on flange 12 extends radially outwardly and exteriorally away from the center portion of such bolt-on flange. Preferably, the wheel body 10 is of integral cast aluminum construction, thereby afording maximum strength combined with a minimum cost of manufacture and minimum weight.

Hub 20 is of generally hat-shaped configuration having a central truncated frusto-conical cap member 16 and a cup member 18 integral with such cap member 16 that abuts the face of a bolt-on flange 12. Cup member 18 covers the lug nuts (not shown) received by lug nut bores 21 formed in bolt-on flange 12. A first plurality of circumferentially spaced recesses 26 are formed in the front portion of cap member 16 and a second plurality of like circumferentially spaced recesses 28 are formed on the periphery of cup member 18. Recesses 26 and 28 face generally radially outwardly.

With reference to FIG. 2, the wheel body 10 is formed adjacent the intermediate front underside of the drop center tire rim 14 with a first plurality of like spherical, circumferentially spaced sockets 30. A second set of like spherical sockets 32 are circumferentially spaced about the radially outer front portion of the drop center tire rim 14, radially outwardly of the first set of sockets 30. Sockets 30 and 32 face generally radially inwardly. A first set of spokes S-1 extend between the recesses 26 of cap 16 and the first spherical sockets 30. A second set of shorter spokes S-2 extend between the recesses 28 of cup 18 and the radially outer second set of sockets 32 formed in drop center tire rim 14.

The radially outer ends of the spokes S-1 and S-2 are each provided with mounting members, generally designated 40, of like construction. As shown particularly in FIG. 3, such mounting members include a generally cylindrical boss 42, the radially outer end of which is formed with a ball 44 that seats within one of the aforedescribed sockets 30 or 32. Each boss 42 is formed with a cavity 46 which receives a coil compression spring 48. The radially outer end of each spring cavity 46 is coaxial with a bore 50 of smaller diameter than the spring cavity. With continued reference to FIG. 3, the radially outer end of each spoke is formed with a pin 54 of reduced diameter that extends through the mounting members 40 and has a longitudinally slidable relationship therewith, bore 50 having a snug but movable fit with pin 54. The radially inner end of each spring 48 abuts a shoulder 56 defined between the body of each spoke and its pin 54. It will be apparent that each spring 48 biases its respective spoke, and spoke mounting member 40 longitudinally apart.

The manner whereby the spokes S-1 and S-2 are removeably installed on the wheel body defined by casting 10 and hub 20 is illustrated in FIG. 2. Thus referring to FIG. 2, there is shown one of the longer spokes S-1 of such wheel which is to be manipulated from its phantom outline non-installed position to its solid line installed position. Such installation is readily effected by first inserting ball 44 of mounting member 40 within socket 30. The spoke S-1 is then forced radially outwardly against the compressive pressure of spring 48 to reduce the effective length of the spoke, whereby the radially inner end of such spoke may be seated within recess 26. Thereafter, the spoke is released and it will then remain firmly anchored in place upon the wheel. Should such removal of the spoke be desired, it is only necessary to urge the spoke radially outwardly within its mounting member 40 until the radially inner end of the spoke clears its recess 26. When installed, each spoke is placed in compression relative to the wheel. Accordingly, the spoke will be rigidly supported upon the wheel in a rattle-free condition. It will be apparent that the shorter spokes S-2 can be installed within and removed from their respective recesses and sockets in the same manner described hereinbefore, with respect to the longer spokes S-1. The spokes are solely ornamental in function and do not lend any appreciable strength to the wheel. It should be observed that the spacing and positioning of the recesses and sockets as well as the configuration of the spokes may be widely varied so as to permit wide leeway to automobile stylists. It should further be noted that since the spokes are sealed with respect to the brake drum and other interior wheel supporting components by the solid bolt on flange 12 and hub 20, such spokes will not be exposed to grease or other foreign matter. Finally, it should be noted that the exteriorly facing portion of wheel body 10 may be brightly polished so as to provide an aesthetically pleasing appearance.

From the foregoing description it will be apparent that the spokes S-1 and S-2 may be quickly and easily replaced for repair, replacement or cleaning. Yet, when installed, the spokes will be firmly locked in place. It is not necessary to thread or unthread the spokes mounting members, nor is it necessary to be concerned about the amount of torque applied to the spoke mounting members.

Various modifications and changes may be made with respect to the foregoing detailed description without departing from the spirit of the present invention.

I claim:

1. In a vehicle wheel construction having a solid wheel that includes a radially extending bolt-on flange which merges into a tire-receiving rim;
   a plurality of replaceable spokes extending between radially inner and outer points on said wheel;
   a mounting member carried by each of said spokes that is longitudinally slidable relative to its respective spoke; and
   spring means interposed between each spoke and its mounting member biasing such spoke and its mounting member longitudinally apart, with said spokes being releasably retained in place between said inner and outer points by the compressive force exerted by said spring means between such spokes and their mounting members, and with said spokes being ornamental in function in that they do not lend any appreciable strength to said wheel.

2. The vehicle wheel construction of claim 1, wherein said inner and outer points are respectively defined by a recess and a socket and said mounting member is carried by the outer ends of said spokes, with the outer end of each mounting member having a ball removably disposed within one of said sockets.

3. The vehicle wheel construction of claim 2, wherein the radially outer end of each spoke is formed with a pin of reduced diameter, and said mounting members are each formed with a boss having a spring cavity and a bore coaxial with said spring cavity that has a snugly longitudinal slidable relationship with its respective spoke pin, and with said spring means comprising a coil compression spring received within said spring cavity.

4. In a vehicle wheel construction that includes a solid wheel body having a radially extending bolt-on flange that merges into a tire-receiving rim, and a cylindrical hub coaxially secured to the radially inner portion of said bolt-on flange and extending axially forwardly away from said flange, the combination of:
   a plurality of first recesses spaced circumferentially around the periphery of the front portion of said hub, and facing generally radially outwardly;
   a plurality of second recesses spaced circumferentially around the periphery of said hub rearwardly of said first recesses and facing generally radially outwardly;
   a plurality of first sockets spaced circumferentially around the periphery of the intermediate portion of said wheel body and facing generally radially inwardly;
   a plurality of second sockets spaced circumferentially around the periphery of said wheel body radially outwardly and forwardly of said first sockets, said second sockets facing generally radially inwardly;
   a first plurality of removable ornamental spokes, each having their radially inner end disposed within one of said first recesses;
   a second plurality of removable ornamental spokes, each having their radially inner end disposed within one of said second recesses;
   a spoke mounting member longitudinally slidably carried upon the outer portion of each of said spokes, each said mounting member carried by said first spokes having a ball that is removably disposed within one of said first sockets, and each said mounting member carried by said second spokes having a ball that is removably disposed within one of said second sockets; and
   spring means operatively interposed between the outer ends of each spoke and the spoke's mounting member, said spring means biasing said spoke and its mounting member longitudinally apart, with said spokes being releasably retained in place upon said wheel by the compressive force exerted by said spring between said mounting members and said spokes.

5. A vehicle wheel construction as set forth in claim 4, wherein said second spokes are shorter than said first spokes.

6. A vehicle wheel construction as set forth in claim 5, wherein the radially outer end of each spoke is formed with a pin of reduced diameter, and said mounting members are each formed with a boss having a spring cavity and a bore coaxial with said spring cavity that has a snugly longitudinal slidable relationship with its respective spoke pin, and with said spring means comprising a coil compression spring received within said spring cavity.

7. A vehicle wheel construction as set forth in claim 4, wherein the radially outer end of each spoke is formed with a pin of reduced diameter, and said mounting members are each formed with a boss having a spring cavity and a bore coaxial with said spring cavity that has a snugly longitudinal slidable relationship with its respective spoke pin, and with said spring means comprising a coil compression spring received within said spring cavity.

* * * * *